US010707634B2

(12) United States Patent
Vogl

(10) Patent No.: US 10,707,634 B2
(45) Date of Patent: Jul. 7, 2020

(54) METHOD FOR PRODUCING A SOLDERED CONNECTION, ELECTRICAL PLUG-IN CONNECTOR FOR SOLDERING TO A COAXIAL CABLE AND USE OF SUCH A PLUG-IN CONNECTOR

(71) Applicant: Telegaertner Karl Gaertner GmbH, Steinenbronn (DE)

(72) Inventor: Manfred Vogl, Kernen im Remstal (DE)

(73) Assignee: Telegaertner Karl Gaertner GmbH, Steinenbronn (DE)

(*) Notice: Subject to any disclaimer, the term of this patent is extended or adjusted under 35 U.S.C. 154(b) by 337 days.

(21) Appl. No.: 15/792,869

(22) Filed: Oct. 25, 2017

(65) Prior Publication Data
US 2018/0131150 A1 May 10, 2018

Related U.S. Application Data

(63) Continuation of application No. PCT/EP2016/060080, filed on May 4, 2016.

(30) Foreign Application Priority Data

May 7, 2015 (DE) .................... 10 2015 107 180

(51) Int. Cl.
*B23K 1/002* (2006.01)
*H01R 43/02* (2006.01)
(Continued)

(52) U.S. Cl.
CPC ......... *H01R 43/0242* (2013.01); *B23K 1/002* (2013.01); *B23K 3/08* (2013.01);
(Continued)

(58) Field of Classification Search
CPC ............ H01R 43/0207; H01R 43/0242; H01R 43/0249; H01R 43/20; H01R 43/28;
(Continued)

(56) References Cited

U.S. PATENT DOCUMENTS

| 3,504,149 A | 3/1970 | Dixon et al. |
| 5,281,167 A | 1/1994 | Le et al. |

(Continued)

FOREIGN PATENT DOCUMENTS

| CA | 862478 | 2/1971 |
| CN | 102426129 | 4/2012 |

(Continued)

*Primary Examiner* — Hung D Nguyen
(74) *Attorney, Agent, or Firm* — Lipsitz & McAllister, LLC

(57) ABSTRACT

A method for producing a soldered connection between at least two components is provided, in which the components are heated for melting a solder in a soldering area. The heating of the soldering area and/or the supply of solder to the soldering area is realized depending on the temperature which is determined by non-contact detection of heat radiation emitted from at least one temperature measurement zone of one of the components. In order to improve the method such that the emissivity of the at least one temperature measurement zone can be increased with high process reliability and with at most a slight adverse effect on the electrical connection between the electrical components, it is proposed that the at least one temperature measurement zone be locally heated for increasing its emissivity. Furthermore, an electrical plug-in connector for producing a soldered connection and use of such a plug-in connector are proposed.

12 Claims, 1 Drawing Sheet

(51) Int. Cl.
*H01R 9/05* (2006.01)
*B23K 3/08* (2006.01)
*H01R 4/02* (2006.01)
*G01K 13/12* (2006.01)
*B23K 13/01* (2006.01)
*B23K 101/38* (2006.01)
*H01R 24/40* (2011.01)
*H01R 103/00* (2006.01)

(52) U.S. Cl.
CPC ........... *G01K 13/125* (2013.01); *H01R 4/025* (2013.01); *H01R 9/05* (2013.01); *B23K 2101/38* (2018.08); *H01R 24/40* (2013.01); *H01R 2103/00* (2013.01)

(58) Field of Classification Search
CPC ...... H01R 9/05; H01R 9/0503; H01R 9/0515; H01R 24/38; H01R 24/40; H01R 24/42; H01R 24/44; H01R 4/023; H01R 4/024; H01R 4/025; H01R 4/029; H01R 4/723; H01R 2103/00; B23K 1/0016; B23K 1/0056; B23K 1/002; B23K 3/00; B23K 3/025; B23K 3/0475; B23K 3/08; B23K 2101/38; G01K 13/125

USPC ............. 219/616, 617, 633, 667, 85.1, 85.2, 219/85.21, 129
See application file for complete search history.

(56) References Cited

U.S. PATENT DOCUMENTS

| | | | |
|---|---|---|---|
| 5,902,507 A | 5/1999 | Wiezbowski et al. | |
| 2004/0058582 A1* | 3/2004 | Wendling | H01R 9/0518 439/582 |
| 2009/0232594 A1* | 9/2009 | Ng | H01R 9/05 403/353 |
| 2011/0163085 A1 | 7/2011 | Kalmbach et al. | |
| 2013/0186941 A1 | 7/2013 | Nikkhoo et al. | |
| 2014/0378010 A1* | 12/2014 | Beck | H01R 4/023 439/874 |

FOREIGN PATENT DOCUMENTS

| | | |
|---|---|---|
| CN | 103604504 | 2/2014 |
| DE | 102008046330 | 3/2010 |
| EP | 2022589 | 2/2009 |
| TW | 201017916 | 5/2010 |
| WO | 9217923 | 10/1992 |

* cited by examiner

METHOD FOR PRODUCING A SOLDERED CONNECTION, ELECTRICAL PLUG-IN CONNECTOR FOR SOLDERING TO A COAXIAL CABLE AND USE OF SUCH A PLUG-IN CONNECTOR

This application is a continuation of international application number PCT/EP2016/060080 filed on May 4, 2016, and claims the benefit of German application number 10 2015 107 180.0 filed on May 7, 2015, which are incorporated herein by reference in their entirety and for all purposes.

BACKGROUND OF THE INVENTION

The invention relates to a method for producing a soldered connection between at least two components, in which method the components are heated in a soldering area for melting a solder, wherein the heating of the soldering area and/or the supply of solder to the soldering area is realized depending on the temperature which is determined by non-contact detection of heat radiation emitted from at least one temperature measurement zone of one of the components.

The invention further relates to an electrical plug-in connector for soldering to a coaxial cable, wherein the plug-in connector comprises a soldering area for producing a soldered connection in accordance with the above-mentioned method.

Furthermore, the invention relates to the use of such an electrical plug-in connector.

Soldered connections enable at least two components to be connected together electrically and mechanically. The components to be connected together are placed together, and subsequently a soldering area of the components is heated so that a solder arranged in the soldering area melts and wets the components in their connection area. The soldering area can be heated for example by way of an induction coil that surrounds the soldering area. In order to ensure that, on the one hand, the soldering area is heated sufficiently for the solder arranged therein to melt and wet the components and, on the other hand, excessive heating and hence potential attendant damage to the components is prevented, the application of heat is often realized depending on a temperature that is determined in a non-contact manner. For the determination of the temperature, the heat radiation emitted from at least one temperature measurement zone of one of the components is detected. The heat radiation can be detected with the aid of a pyrometer, for example.

The heat radiation emitted from the at least one temperature measurement zone depends on the emissivity of the temperature measurement zone. The emissivity of the temperature measurement zone depends, among other things, on the nature of its surface, particularly the reflectivity thereof. Surfaces with high reflectivity, in particular metal surfaces with high reflectivity, have a rather low emissivity. This low emissivity makes it difficult to determine the temperature with high process reliability and in a quickly detectable and reproducible manner.

In order to increase the emissivity of a temperature measurement zone, it has been proposed heretofore to coat the temperature measurement zone with a high-emissivity lacquer prior to the actual soldering process. However, applying a coat of lacquer has the disadvantage that the lacquer must then dry and therefore drying times must be allowed. Furthermore, when the lacquer coat is applied, solvent vapours are generated and these must be drawn away to avoid health hazards. Often, the lacquer spreads over the temperature measurement zone in an uncontrolled manner because, depending on the geometry of the temperature measurement zone, it is subject to adhesion and cohesion forces that are difficult to predict. The lacquer coating therefore often has a non-uniform thickness and hence also a non-uniform emission of heat radiation. Furthermore, sometimes the temperature measurement zone is only incompletely wetted with lacquer.

Furthermore, the use of lacquer for increasing the emissivity of the temperature measurement zone has the drawback that the lacquer may adversely affect the electrical properties of the components connected together. This applies in particular to the making of a soldered connection between electrical components which are intended to transmit high-frequency electrical signals. Here, applying a coat of lacquer to the temperature measurement zone can exacerbate passive intermodulation of the components. Passive intermodulation is understood to be the mutual interference of electrical signals that are transmitted at different frequencies via the components. Passive intermodulation is influenced, among other things, by the constituents of the lacquer that is applied to the temperature measurement zone.

As an alternative to applying a lacquer to a temperature measurement zone, it has also been proposed heretofore to adhesively bond a thin layer to the temperature measurement zone for increasing the emissivity thereof. However, such a procedure is only feasible where temperature measurement zones are readily accessible and, further, has the disadvantage that the adhesive used to adhesively bond the thin layer to the temperature measurement zone can adversely affect the electrical properties of the components, in particular the passive intermodulation performance thereof. In addition, it is known from low-frequency applications that adhesive having non-uniform thermal conductivity contributes to a further increase in measurement uncertainty.

It is therefore an object of the present invention to improve a method of the kind mentioned at the outset such that the emissivity of the at least one temperature measurement zone can be increased with high process reliability and with at most a slight adverse effect on the electrical components.

SUMMARY OF THE INVENTION

In accordance with the invention, this object is accomplished in a method of the generic kind by the at least one temperature measurement zone being locally heated for increasing its emissivity.

The local heating of the at least one temperature measurement zone results in a change in the surface structure thereof. It has been shown that the emissivity of the at least one temperature measurement zone can thereby be increased without the need for an additional material to be coated on or adhesively bonded to the at least one temperature measurement zone.

Detecting heat radiation that is emitted from a plurality of temperature measurement zones provides the advantage that the temperature of the soldering area can be determined with greater accuracy and higher process reliability. Furthermore, additional information can be derived from the difference between the emission measurements from different temperature measurement zones.

Preferably, the at least one temperature measurement zone is for example oxidized on its surface by the specific heating thereof. The oxidation results in a dark discolouration of the surface by way of which the emissivity of the at least one temperature measurement zone is substantially increased.

It is particularly advantageous for a thin, highly reflective surface layer of the at least one temperature measurement zone to be vaporized, i.e. ablated, by the local heating thereof. The thickness of the surface layer vaporized by the heating may be a few micrometres, for example a maximum of 5 to 10 micrometres, in particular 2 to 5 micrometres.

Vaporizing a thin surface layer of the at least one temperature measurement zone is particularly advantageous if the temperature measurement zone is arranged in the area of a galvanic coating of one of the components. The galvanic coating can have a thickness of a few micrometres, and this thin galvanic coating can be ablated by the heat treatment of the at least one temperature measurement zone. A material layer arranged beneath the galvanic coating can simultaneously be oxidized.

In cases where the component having the at least one temperature measurement zone comprises a highly reflective galvanic coating and a material layer which is arranged beneath the galvanic coating and can be oxidized and thereby discoloured darkly by the application of heat, a particularly high emissivity can be achieved by the thermal ablation of the galvanic coating and by the oxidation of a material layer arranged therebeneath, without thereby impairing the electrical properties of the components to any appreciable extent. In particular, a heat treatment of the at least one temperature measurement zone does not result in the passive intermodulation performance being appreciably degraded, although the surface structure is specifically and locally altered.

Provision may be made for the at least one temperature measurement zone to be locally heated for increasing its emissivity at a time immediately before the temperature detection is started. However, it may also be provided that the local heating of the at least one temperature measurement zone is realized at a temporal distance before the start of the detection of the heat radiation emitted from the temperature measurement zone.

For example, the local heating of the at least one temperature measurement zone may be realized before the parts that are to be connected together are placed together.

In particular, it may be provided that at least one of the components that are to be soldered together is coated in at least its soldering area and that in a later process step at least one temperature measurement zone which is arranged in the area of the coating is locally heated for increasing the emissivity thereof and that it is only in a step subsequent thereto that said component is placed together with at least one further component in order to be subsequently soldered together with said at least one further component in a temperature-controlled manner.

The component comprising the at least one temperature measurement zone may be further processed as bulk material after the temperature measurement zone thereof has been locally heated. The temperature measurement zone is not damaged by subsequent processing steps of the component after it has been locally heated, and the heat radiation emitted therefrom can be detected by a temperature sensor whose principle of operation relies on emitted heat radiation, for producing, in a later soldering process, a soldered connection in a temperature-controlled manner.

The local heat treatment of the at least one temperature measurement zone which is realized for the purpose of increasing the emissivity thereof may be realized for example by the application of laser radiation to the temperature measurement zone. The application of laser radiation is advantageous in that it provides a simple way of locally heating even difficult-to-access and/or non-planar, for example curved, temperature measurement zones.

Furthermore, the application of laser radiation to the at least one temperature measurement zone has the advantage that at least a portion of one or more temperature measurement zones can have applied thereto a relatively high level of energy over a short period of time so that a solder preform arranged in the soldering area is locally liquefied and, upon subsequent cooling thereof, is fixed to the component.

At least one temperature measurement zone can also serve as an information carrier in order for example to indicate the part number and/or the date of manufacture of the component and/or other information. The indication can be in an encoded form in particular, for example in the form of a barcode or a matrix code. For example, it may be provided for the temperature measurement zone to carry a QR (quick response) code.

As has already been mentioned, the local heating of the at least one temperature measurement zone for the purpose of increasing the emissivity thereof can be realized by applying laser radiation to the temperature measurement zone. This provides the possibility of also utilizing the laser radiation for displaying the above-mentioned information, preferably in an encoded form. To this end, for example, a pattern, in particular a barcode or a matrix code, QR code, can be created on the temperature measurement zone by way of the laser radiation, and said pattern can then be detected at a later point in time using non contact type, for example optical, or contact type detection techniques.

The power of the laser radiation source providing the laser radiation is preferably no more than 20 watts. In particular, a power of 5 to 15 watts, for example 10 watts, has proven to be advantageous.

In an advantageous embodiment of the method in accordance with the invention, the at least one temperature measurement zone has applied thereto laser radiation for a time period of up to 5 seconds for increasing the emissivity thereof. In particular, laser application for a time period of 1 to 2 seconds has proven to be advantageous.

Advantageously, the laser radiation source providing the laser radiation is a solid state laser, particularly a fibre laser.

The heating of the soldering area of the components to be connected together which is realized depending on the contactlessly detected temperature of the at least one temperature measurement zone is advantageously realized by way of an induction coil which is connected to an energy supply device that can be controlled depending on the contactlessly detected temperature of the temperature measurement zone. The induction coil can surround the soldering area of the components to be soldered together in a circumferential direction. The supply of energy to the induction coil is realized depending on the temperature of the temperature measurement zone. Since the emissivity of the temperature measurement zone has been increased by local heating thereof in a previous process step, the temperature can be determined with high process reliability and in a quick and reproducible manner, and the energy supply to the induction coil can be reliably controlled depending on the temperature.

The components to be connected together may, for example, be an electrical plug-in connector and an electrical cable. The soldered connection between the electrical plug-in connector and the cable can be made practically without adversely affecting passive intermodulation performance and can be carried out within a very short time.

The invention further relates to an electrical plug-in connector for producing a soldered connection with a coaxial cable, wherein the soldered connection is produced in accordance with any one of the preceding methods.

The electrical plug-in connector in accordance with the invention has a soldering area for producing the soldered connection with an outer conductor of the coaxial cable. The electrical plug-in connector comprises, for non-contact temperature detection, at least one temperature measurement zone having a surface structure altered by local heat treatment.

As has already been mentioned, the local heat treatment of the at least one temperature measurement zone causes the emissivity thereof to be increased and this in turn enables the temperature of the temperature measurement zone to be determined with high process reliability and in a quick and reproducible manner, on the basis of which the soldered connection between the electrical plug-in connector and the coaxial cable can be produced without thereby adversely affecting the transmission of electrical signals from the coaxial cable to the electrical plug-in connector.

The at least one temperature measurement zone of the plug-in connector is advantageously oxidized by the local heat treatment thereof.

Alternatively or in addition, provision may be made for a surface layer of the at least one temperature measurement zone to be vaporized by the local heating thereof. The thickness of the surface layer may be a few micrometres, for example a maximum of 5 to 10 micrometres.

It is of particular advantage for the electrical plug-in connector in accordance with the invention to comprise at least one cable connecting section for receiving an end section of the coaxial cable, wherein the cable connecting section has a galvanic coating and the at least one temperature measurement zone is arranged on the cable connecting section and is thermally ablated on the surface. For example, the cable connecting section may have a galvanic coating, involving the use of silver, and a core of a copper material, wherein the galvanic silver layer is thermally ablated in the area of the at least one temperature measurement zone and the copper material arranged underneath the galvanic silver layer is oxidized in the area of the temperature measurement zone, wherein the copper material is darkly discoloured by the oxidation process. As a result of the galvanic coating, the plug-in connector exhibits a high reflectivity in the cable connecting section. Ablating the galvanic coating and oxidizing the underlying material in the area of the temperature measurement zone ensure that the temperature of the temperature measurement zone can be determined with high process reliability and in a quick and reproducible manner for controlling the soldering process in which the cable connecting section is heated depending on the temperature of the temperature measurement zone.

Alternatively or in addition to the temperature-dependent heating of the soldering area, solder can also be supplied to the soldering area depending on the contactlessly detected temperature of the at least one temperature measurement zone, for producing a soldered connection between at least two components. The soldering area can be heated so that the supplied solder melts, wherein the speed of solder supply is dependent on the detected temperature of the temperature measurement zone. Solder is supplied at a higher speed when the detected temperature exceeds a predetermined maximum value, and solder is supplied at a lower speed when the detected temperature falls below a predetermined minimum value. The supply of solder can thus be adapted to match the melting and wetting behaviour of the supplied solder with simple structure and high process reliability.

The plug-in connector in accordance with the invention is particularly suitable for use in the field of mobile radio communications, i.e. for transmitting electrical signals having a frequency of at least 500 MHz, in particular 500 MHz to 3 GHz. The plug-in connector can be electrically and mechanically connected to a coaxial cable using the above-mentioned method in order to transmit electrical signals, preferably in a frequency range from 0.5 GHz to 3 GHz, with very low passive intermodulation.

The following description of an advantageous embodiment of the invention, taken in conjunction with the drawings, serves to explain the invention in greater detail.

DETAILED DESCRIPTION OF THE INVENTION

Figure 1:
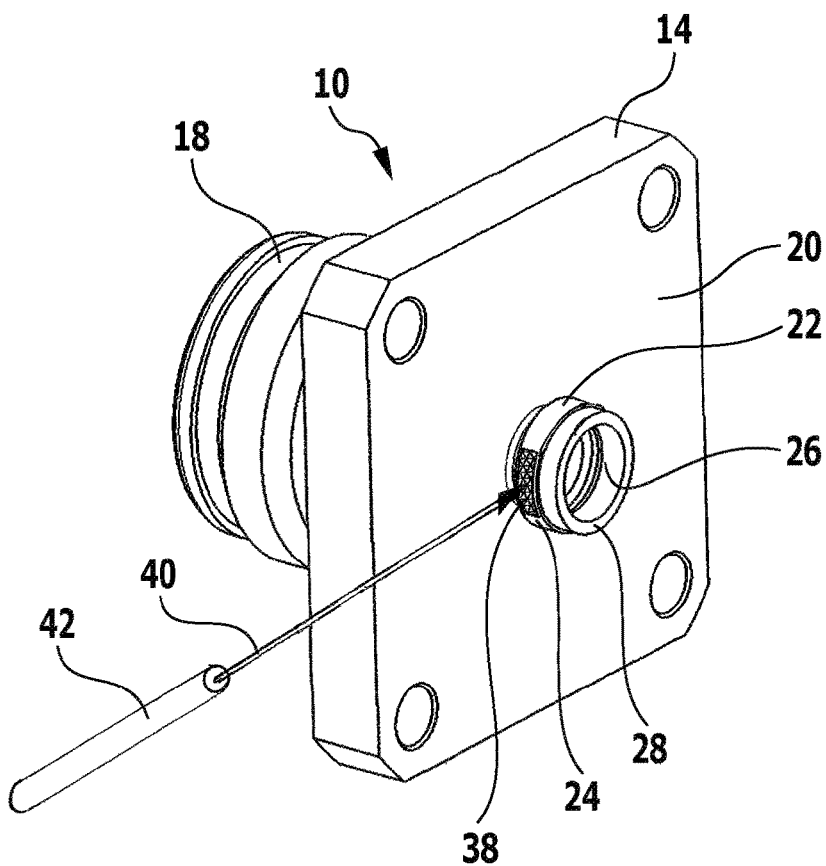
FIG. 1 shows a perspective representation of a component in the form of an electrical plug-in connector in whose soldering area a temperature measurement zone having increased emissivity for heat radiation is created.
Figure 2:
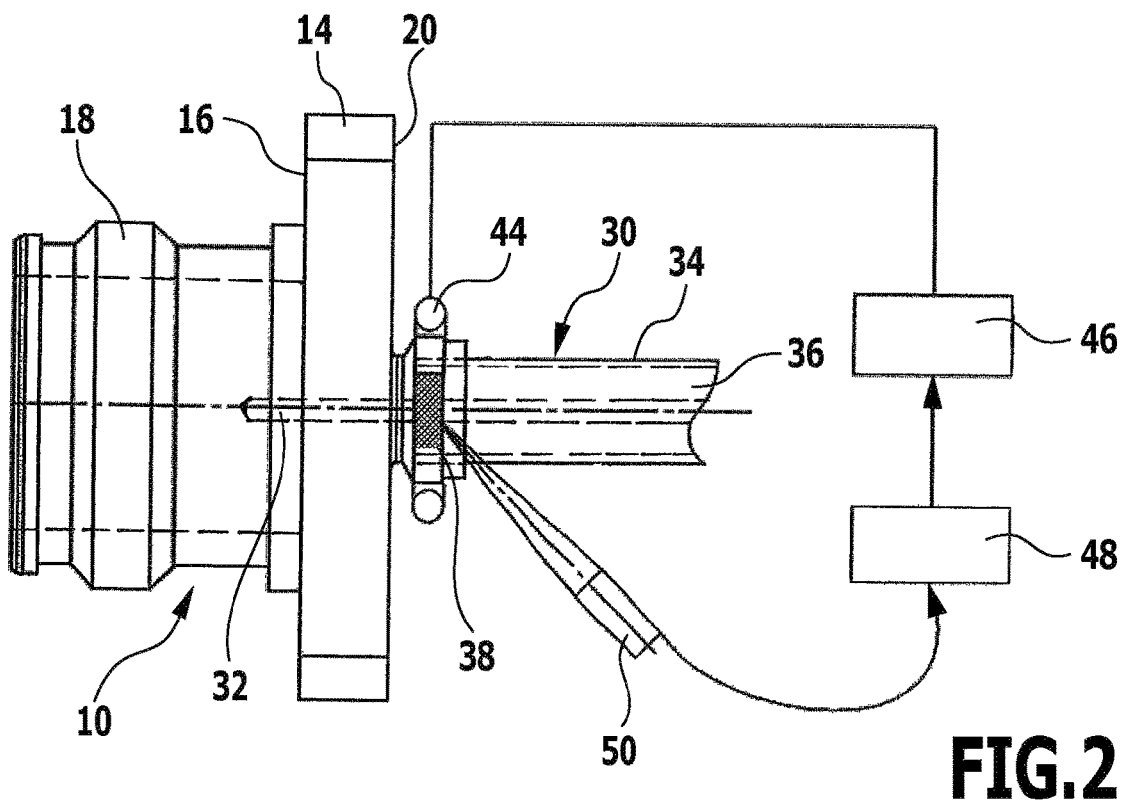
FIG. 2 shows a schematic representation of the temperature-controlled soldering process for producing a soldered connection between the plug-in connector of FIG. 1 and a coaxial cable.

Schematically represented in the drawing are an electrical plug-in connector 10 and a coaxial cable 30 which are electrically and mechanically connected together by way of a soldered connection and which are suited for use in the field of mobile radio communications in particular. In the exemplary embodiment as illustrated, the electrical plug-in connector 10 comprises a flange 14 which can, for example, be screwed together with a housing of an electrical device which has been omitted from the drawing for clarity of illustration.

Adjoining a front side 16 of the flange 14 is a sleeve-shaped socket 18 into which can be inserted a plug of an electrical plug-in connector of complementary configuration, known per se and not shown in the drawing. Adjoining the rear side 20 of the flange 14, facing away from the front side 16, is a sleeve-like cable connecting section 22 which forms a soldering area 24 of the electrical plug-in connector 10 and in which is inserted an annular solder preform 26, wherein the solder preform 26 projects, at an end section 28 thereof facing away from the rear side 20, from the cable connecting section 22.

The electrical plug-in connector 10 has a galvanic coating of silver which imparts a high reflectivity to the electrical plug-in connector 10. This improves the electrical shielding properties of the electrical plug-in connector 10.

However, as a result of the high level of reflectivity, the electrical plug-in connector 10 has only a low emissivity for heat radiation.

The cable connecting section 22 receives an end section of a coaxial cable 30 which has, in a customary manner, an inner conductor 32 and an outer conductor 34 with a dielectric material 36 arranged therebetween. The outer conductor 34 and the cable connecting section 22 are soldered together in a manner discussed in more detail below, and the inner conductor 32 extends into the socket 18.

Before the coaxial cable 30 is inserted into the cable connecting section 22, at least one temperature measurement zone 38 is created on the outer side of the cable connecting section 22, said temperature measurement zone 38 having a high emissivity for heat radiation. To this end, the cable connecting section 22 is locally heated by application of laser radiation 40 in an area extending over only a portion of its circumference. The laser radiation 40 is provided by a solid state laser, which in the exemplary embodiment illustrated is a fibre laser 42. The temperature measurement zone 38 is heated by the laser radiation acting on the temperature measurement zone 38 for approximately 1 to 2 seconds sufficiently for the surface structure thereof to be altered by vaporizing the galvanic coating, having a thickness of some micrometres, particularly 2 to 5 micrometres, of the cable connecting section 22 in the area of the temperature measurement zone 38 and oxidizing the underlying copper material. The oxidation of the copper material leads to a dark discolouration thereof and has the result that the temperature measurement zone 38 exhibits a high level of emissivity for heat radiation as contrasted to that of the remaining area of the cable connecting section 22.

In the exemplary embodiment as illustrated, the power of the fibre laser is approximately 10 watts. Fibre lasers with such a power are per se known to the person skilled in the art for use in component labelling.

After the temperature measurement zone 38 has been created, the electrical plug-in connector 10 can be further processed as bulk material. In order to make a soldered connection between the electrical plug-in connector 10 and the coaxial cable 30, an end section of the coaxial cable 30 can then, at a later time, be inserted into the cable connecting section 22, wherein the end section of the coaxial cable 30 surrounds the solder preform 26. The cable connecting section 22 is then heated via an induction coil 44 sufficiently for the solder preform 26 to melt and wet both of the cable connecting section 22 and the outer conductor 34. The induction coil 44 is supplied with energy by an energy supply device in the form of a high-frequency generator 46 which is controlled by a control unit 48 depending on the temperature of the temperature measurement zone 38. The temperature of the temperature measurement zone 38 is determined by non-contact detection of heat radiation emitted from the temperature measurement zone 38. A pyrometer 50 is used for detecting the heat radiation, with the output of said pyrometer 50 connected to the control unit 48.

Via the control unit 48, the supply of energy to the induction coil 44 is controlled such that the cable connecting section 22 is heated by way of the induction coil 44 until the temperature of the temperature measurement zone 38 detected by the pyrometer reaches a predetermined target temperature. The target temperature is selected such that the solder preform 26 is caused to melt but the coaxial cable 30 and the electrical plug-in connector 10 are not damaged.

Since the temperature measurement zone 38 has a high emissivity for heat radiation as a result of its exposure to laser radiation 40 in a previous process step, the temperature of the temperature measurement zone 38 can be detected with a high process reliability and the actual soldering process can be performed depending on the temperature detected and within a very short time.

What is claimed is:

1. A method for producing a soldered connection between at least two components, comprising:
   heating the at least two components for melting a solder in a soldering area,
   wherein:
   the heating of the soldering area and/or a supply of solder to the soldering area is realized depending on a temperature which is determined by non-contact detection of heat radiation emitted from at least one temperature measurement zone of one of the at least two components,
   the at least one temperature measurement zone is locally heated for increasing its emissivity, and
   the local heating of the at least one temperature measurement zone results in a change in a surface structure thereof.

2. The method in accordance with claim 1, wherein the local heating of the at least one temperature measurement zone is realized at a temporal distance before a start of the detection of the heat radiation emitted from the at least one temperature measurement zone.

3. The method in accordance with claim 1, wherein the local heating of the at least one temperature measurement zone is realized before the components that are to be connected together are placed together.

4. The method in accordance with claim 3, wherein the component comprising the at least one temperature measurement zone is further processed as bulk material before the components are placed together.

5. The method in accordance with claim 1, wherein the at least one temperature measurement zone has laser radiation applied thereto for local heating thereof.

6. The method in accordance with claim 5, wherein the power of the laser radiation source providing the laser radiation is up to 20 watts.

7. The method in accordance with claim 5, wherein the at least one temperature measurement zone has the laser radiation applied thereto for a time period of up to 5 seconds.

8. The method in accordance with claim 5, wherein the laser radiation source providing the laser radiation is a solid state laser, particularly a fibre laser.

9. The method in accordance with claim 1, wherein the heating of the soldering area is realized by way of an induction coil which is connected to an energy supply device that can be controlled depending on the temperature of the at least one temperature measurement zone.

10. The method in accordance with claim 1, wherein the at least two components to be connected together are an electrical plug-in connector and an electrical cable.

11. An electrical plug-in connector for soldering together with a coaxial cable, comprising:
   a soldering area for producing a soldered connection with an outer conductor of the coaxial cable,
   at least one temperature measurement zone having a surface structure altered by local heat treatment for non-contact temperature detection, and
   a cable connecting section for receiving an end section of the coaxial cable,
   wherein the cable connecting section has a galvanic coating which is ablated in an area of the at least one temperature measurement zone.

12. The electrical plug-in connector in accordance with claim 11, wherein the at least one temperature measurement zone is oxidized.

* * * * *